(12) United States Patent
Mercier et al.

(10) Patent No.: US 10,405,314 B2
(45) Date of Patent: Sep. 3, 2019

(54) CHANNEL PLANS FOR WIRELESS LOCAL AREA NETWORKS

(71) Applicant: HEWLETT PACKARD ENTERPRISE DEVELOPMENT LP, Houston, TX (US)

(72) Inventors: Mathieu Mercier, Quebec (CA); Dongwoon Hahn, Santa Clara, CA (US); Sachin Ganu, San Jose, CA (US); Nethra Muniyappa, Santa Clara, CA (US); Sree Harsha, Santa Clara, CA (US); Rajini Balay, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/818,654

(22) Filed: Nov. 20, 2017

(65) Prior Publication Data
US 2019/0159205 A1    May 23, 2019

(51) Int. Cl.
| H04W 72/04 | (2009.01) |
| H04W 72/08 | (2009.01) |
| H04W 16/02 | (2009.01) |
| H04W 28/16 | (2009.01) |
| H04W 16/18 | (2009.01) |
| H04W 24/02 | (2009.01) |

(52) U.S. Cl.
CPC ....... *H04W 72/0453* (2013.01); *H04W 16/02* (2013.01); *H04W 16/18* (2013.01); *H04W 28/16* (2013.01); *H04W 72/08* (2013.01); *H04W 24/02* (2013.01)

(58) Field of Classification Search
CPC . H04W 72/0453; H04W 16/02; H04W 28/16; H04W 72/08; H04W 16/18; H04W 24/02
See application file for complete search history.

(56) References Cited

U.S. PATENT DOCUMENTS

| 8,503,330 | B1 | 8/2013 | Choong et al. |
| 9,001,689 | B1 | 4/2015 | Hinman |
| 9,497,700 | B2 | 11/2016 | Madan et al. |
| 2015/0341939 | A1* | 11/2015 | Sharma ................ H04W 72/08 370/329 |
| 2016/0066200 | A1 | 3/2016 | Dayanandan et al. |

OTHER PUBLICATIONS

Pineiro, M.M. et al., Infrared communication channel optimisation for quasi-diffuse multi-spot wireless indoor networking, (Research Paper), Feb. 28, 2003, 4 Pgs.

* cited by examiner

*Primary Examiner* — Dady Chery
(74) *Attorney, Agent, or Firm* — Hewlett Packard Enterprise Patent Department

(57) ABSTRACT

Examples of the present disclosure include: obtain data collected from a plurality of access points (APs) in a WLAN, including a current allocation of channels to radios of the APs according to a current channel plan; calculate a new channel plan which assigns a different channel to at least one of the radios; calculate a first metric that predicts better network performance achieved by the new channel plan than the current allocation of channels to the radios; determine whether the first metric exceeds a first predetermined threshold; and implement the new channel plan in response to determining that the first metric exceeds the first predetermined threshold.

12 Claims, 8 Drawing Sheets

CHANNEL PLANS FOR WIRELESS LOCAL AREA NETWORKS

BACKGROUND

A wireless local area network (WLAN) may comprise a plurality of access points (APs). Each AP may have at least one radio and each radio may be tuned to a respective channel. Channels may be allocated to radios in such a manner as to avoid interference. So, for example, adjacent radios in the WLAN may be allocated different channels. A channel planning algorithm may be used to calculate a channel plan which allocates a channel for each radio in order to achieve better WLAN performance.

BRIEF DESCRIPTION OF THE DRAWINGS

Examples of the disclosure will now be described, by way of non-limiting example, with reference to the accompanying drawings, in which.

DETAILED DESCRIPTION

Figure 1:
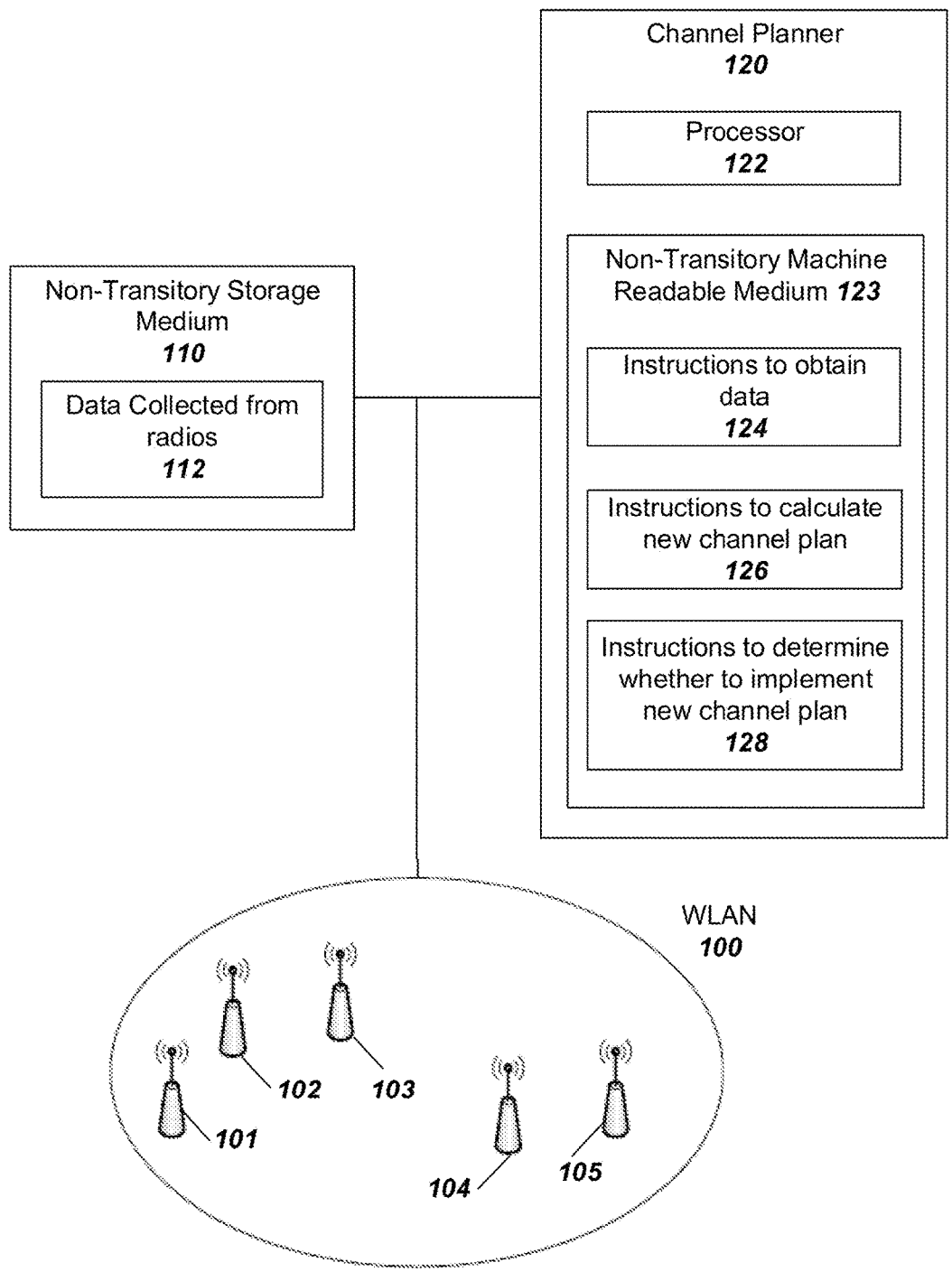
FIG. 1 is an example schematic view of a wireless local area network (WLAN) according to the present disclosure.

For simplicity and illustrative purposes, the present disclosure is described by referring mainly to examples thereof. As used herein, the terms "includes" means includes but not limited to, the term "including" means including but not limited to. The term "comprises" means includes but not limited to, the term "comprising" means including but not limited to. The term "based on" means based at least in part on. The term "number" means any natural number equal to or greater than one. The terms "a" and "an" are intended to denote at least one of a particular element.

As used herein, an 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, a 'client device' generally includes a device that is adapted to transmit and/or receive signaling and to process information within such signaling such as a station (e.g. any data processing equipment such as a computer, cellular phone, personal digital assistant, tablet devices, etc.) or the like.

As used herein, 'network device' generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, a 'channel plan' may generally allocate a channel to each radio in a WLAN. The performance of a channel plan may change over time due to changes in the network topology, changes in the physical environment, interference from external radio sources etc. Therefore, a new channel plan may be calculated periodically in order to maintain high performance. However, changing the channel allocation too often may result in network instability. Furthermore, a new channel plan may sometimes result in minimal improvement in network performance.

Accordingly, examples of the present disclosure may include: obtaining data collected from a plurality of access points (APs) in a WLAN, the data including a current allocation of channels to radios of the APs according to a current channel plan; calculating a new channel plan which assigns a different channel to at least one of the radios; calculating a first metric that predicts better network performance achieved by the new channel plan than the current allocation of channels to the radios; determining whether the first metric exceeds a first predetermined threshold; and implementing the new channel plan in response to determining that the first metric exceeds the first predetermined threshold.

Several examples will now be described with reference to the accompanying drawings.

FIG. 1 shows an example wireless local area network (WLAN) 100 according to the present disclosure. The WLAN 100 includes a plurality of access points (APs) 101, 102, 103, 104, 105. Each AP includes at least one radio. For example, each of the APs 101-105 may include a 2.4 GHz radio, a 5 GHZ radio, or multiple radios with various combinations of both frequency bands.

Each radio may be tuned to a channel for operations. A channel is a frequency range within the frequency band of the AP. For instance, the 2.4 GHz frequency band may be split into 14 channels, each occupying a frequency range within the 2.4 GHz band and separated from each other by 5 MHz. Adjacent channels may overlap and so the number of non-overlapping channels may be less than the total number of channels. The exact number of channels and non-overlapping channels may depend upon the standards and regulations of the country in which the AP is deployed.

Data 112 is collected from the plurality of APs 101-105 and stored in a non-transitory storage medium 110. The non-transitory storage medium 110 may for example be a database for storing AP data. The non-transitory storage medium 110 in which the collected data 112 is stored may, for instance, reside in a wireless controller, a device connected to a wireless controller, a storage system in the cloud or any device capable of receiving and storing data.

The collected data 112 may include a channel allocated to each radio. For example, the channel may be identified by a channel number or channel frequency. The collected data may further include an AP's BSS color, channel-related parameters, such as channel width and radio frequency environment information measured by the AP. For example, radio frequency environment information may include at least one of: a number of external radio signals received by radios of the AP, a received signal strength of each external radio signal as measured by the radios of the AP, noise on the channels as measured by the radios on the AP and path loss on the channels as measured by the radios of the APs. External radio signals may be classified as signals from radios that belong to the same WLAN and which are under control of the channel planner and signals from radios which do not belong to the same WLAN and which are not under control of the channel planner. The collected data 112 may also include data relating to operations of the APs, such as a number of client devices serviced by the radios of the APs, a type of client devices serviced by the radios of the APs, a throughput of received traffic and a throughput of transmitted traffic by the radios of the APs, etc.

The collected data 112 may be received periodically from the APs 101-105. The data 112 may, for example, be received directly by the non-transitory storage medium 110 from the APs 101-105, from a controller in the WLAN 100, or over a network, etc.

Also shown in FIG. 1 is a channel planner 120. The channel planner 120 is a device which is capable of calculating a new channel plan for the radios of the APs in the WLAN. The new channel plan may change the channels allocated to at least one of the radios in order to achieve better network performance. The new channel plan allocate a channel for each radio and may specify characteristics such as channel width for each channel. The channel plan may be calculated based on the collected data. For example, the channel plan may be calculated by: finding a minimum value of a cost function that takes into account the collected data, such as a number of radios, the radio frequency environment, etc.; using integer programming, simulated annealing, or any other techniques. The channel planner 120 may be implemented in a controller, a server, an application running in the cloud, or a data center, etc.

The channel planner 120 may include a processor 122 and instructions stored on a non-transitory machine readable medium 123 and executable by the processor 122. The instructions many include instructions 124 to obtain data 112 from the non-transitory storage medium 110, instructions 126 to calculate the new channel plan, and instructions 128 to determine whether to implement the new channel plan. As mentioned above, while the new channel plan may achieve better network performance compared to the current allocation of channels, changing the channel allocation too frequently may disrupt the WLAN. For example, changing the channel allocation may cause many wireless client devices to dis-associate and re-associate with the APs. Therefore the instructions 128 to determine whether to implement the new channel plan may determine whether to change the channel plan based on various predetermined criteria.

While the non-transitory storage medium 110 storing the collected data 112 and the channel planner 120 are shown separately in FIG. 1, in other examples, they may be integrated into the same device. If the collected data 112 is stored in the same device as the channel planner, then the instructions 124 to obtain the data are instructions to read the data from the device. If the collected data 112 is stored on a separate device from the channel planner, then the instructions 124 to obtain the data are instructions to read or request the data from the non-transitory storage medium 110.

Figure 2:
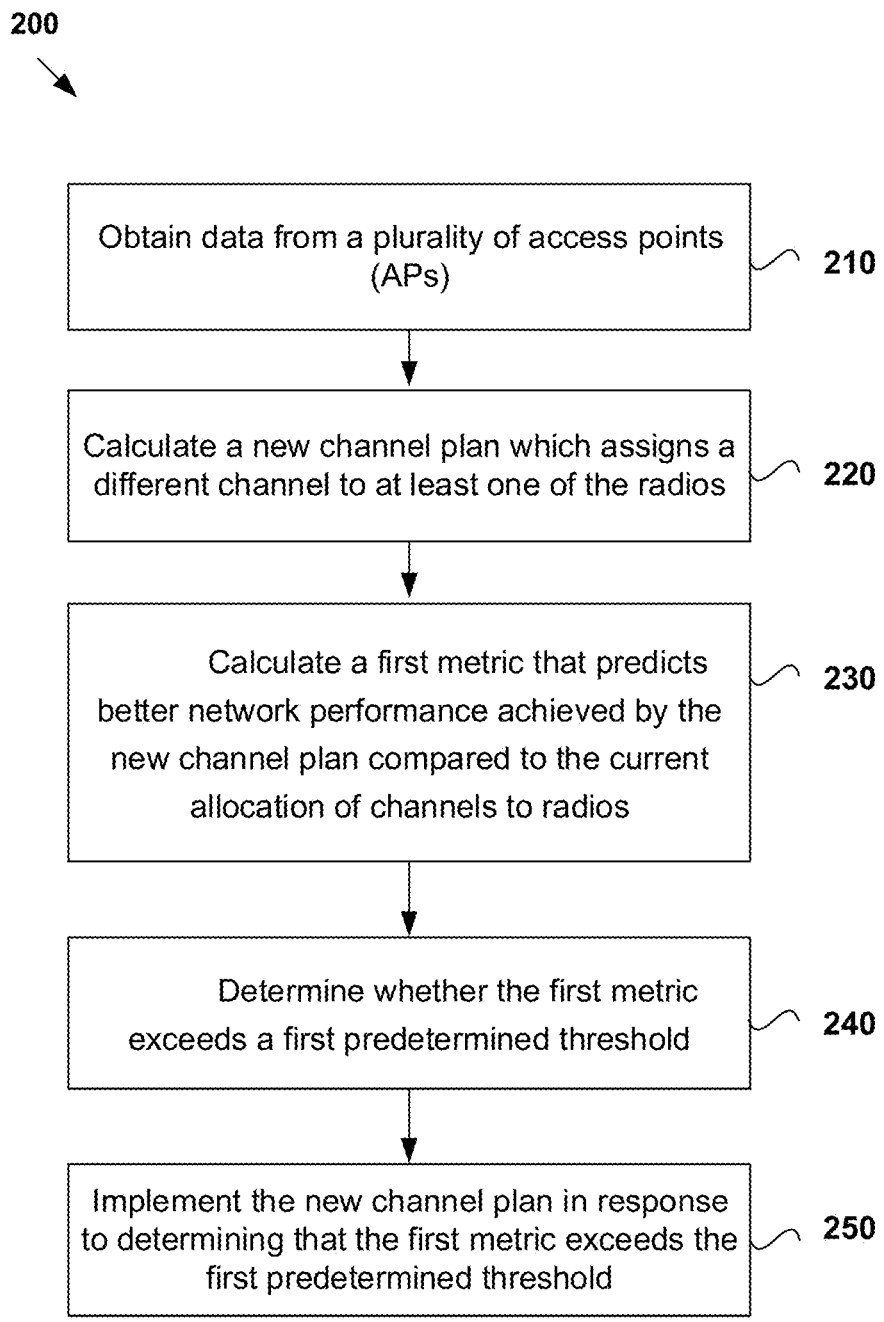
FIG. 2 is an flow diagram of an example method according to the present disclosure.

FIG. 2 shows an example method 200 of operations of the channel planner 120 of FIG. 1.

At block 210, data collected from the plurality of access points is obtained.

The data may have been collected from the APs over a period of time, such as several hours or a day etc. Collecting data from the plurality of access points may include collecting any of the data mentioned above in the discussion of FIG. 1. For example, the collected data may include an identity of each AP and each radio in the WLAN, a channel frequency or channel number allocated to each radio, channel-related parameters (e g channel width,), data relating to the radio frequency environment and operations of the WLAN, etc. The collected data may include a number and/or a type of client device to which the radio transmits packets to or receives packets from, an amount of traffic received and/or transmitted by the radio of the AP, etc. The collected data may be stored externally to the channel planner, such as in the cloud or on an external storage device as shown in FIG. 1, or may be stored in the channel planner itself. The data may be obtained by reading or requesting the data from the storage medium on which the data is stored.

At block 220, the channel planner calculates a new channel plan which assigns a different channel to at least one of the radios. In some examples, multiple radios may be allocated different channels in the new channel plan. In some examples, a majority of the radios may be allocated a different channel in the new channel plan. The channel planner may generate a new channel plan based on the collected data. For example the channel planner may generate a new channel plan based on the current allocation of channels, the radio frequency environment information and/or information on operations of the APs according to the collected data. The channel planner may aim to improve the performance of the WLAN by changing the allocation of channels and/or changing the channel-related parameters.

At block 230, the channel planner may calculate a first metric $T_Q$ that predicts a better network performance achieved by the new channel plan compared to the current allocation of channels to radios.

For instance, the channel planner may calculate the first metric $T_Q$ based on a quality metric $T_{Q1}$ for the new channel plan and a quality metric $T_{Q2}$ for the current allocation of channels. For example, the first metric $T_Q$ which predicts a better network performance may be calculated based on a difference between $T_{Q1}$ and $T_{Q2}$. For instance, the difference may be an absolute difference or a percentage difference between $T_{Q1}$ and $T_{Q2}$.

There are various ways in which network quality may be measured and any suitable metric may be used. In one example, the quality metric may be based on at least one of the following: a number of channel interferences between radios, a network throughput, a network transmit delay and an average channel airtime utilization. The network throughput and/or the network transmit delay may be a peak, average or aggregate value.

At block 240, the channel planner may determine whether the first metric exceeds a first predetermined threshold. In one example, the first predetermined threshold may be exceeded when the first metric is higher than a predetermined threshold; for example, when a high first metric indicates a better performance compared to a low first metric. In another example, the first predetermined threshold may be exceeded when the first metric is less than the first predetermined threshold; for example when a low first metric indicates a better performance compared to a high first metric.

At block 250, the channel planner may implement the new channel plan in response to determining that the first metric exceeds the first predetermined threshold. For example, the new channel plan may be implemented by instructing the APs to allocate channels to their radios in accordance with the new channel plan.

In some examples, if the first metric does not exceed the first predetermined threshold, then the channel planner may determine not to implement the new channel plan and the current allocation of channels to radios may be maintained. In this way, the channel planner may maintain stability and prevent disruption of the network due to frequent changes which do not bring about better performance in operation of the network.

Figure 3:
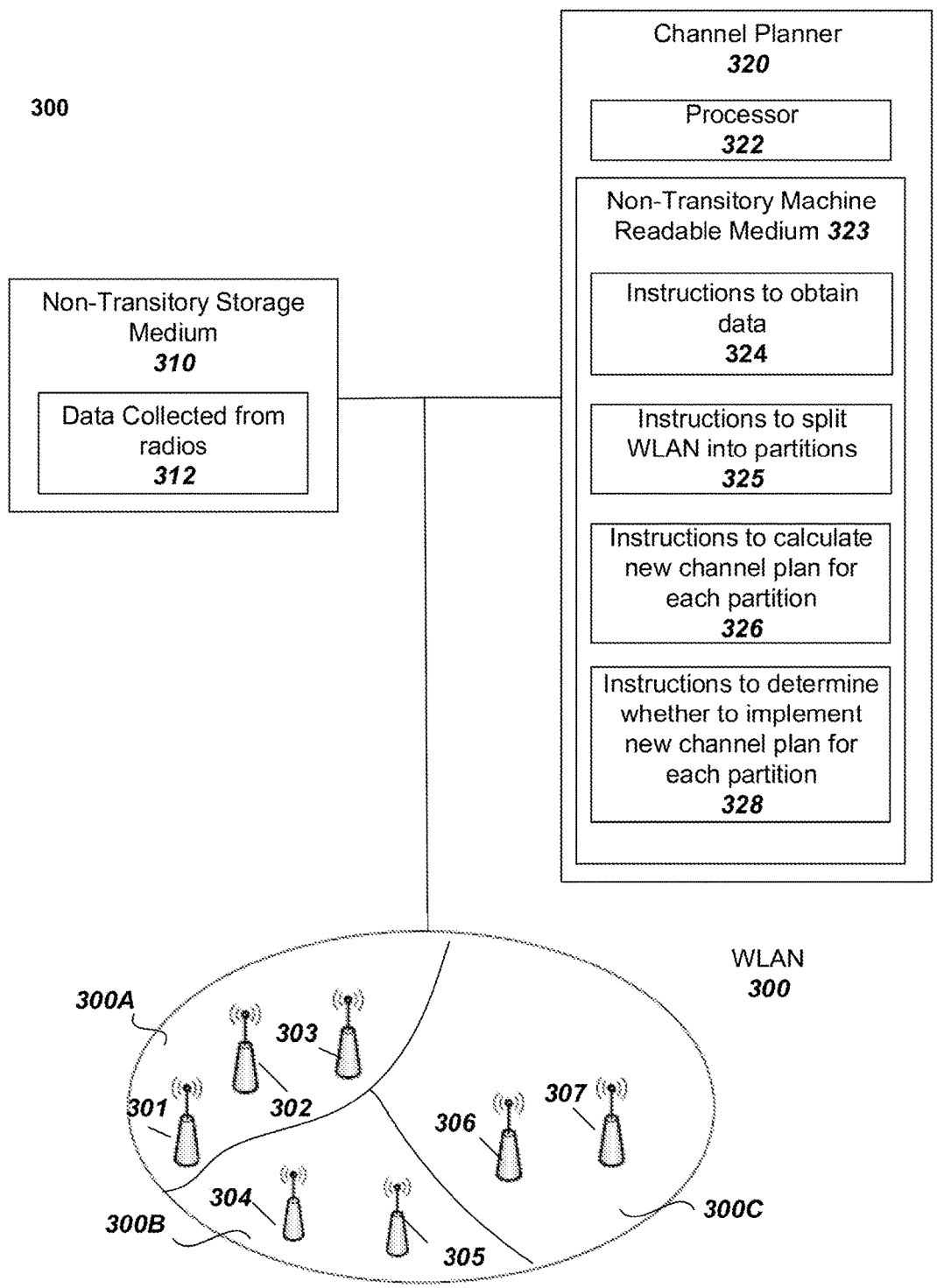
FIG. 3 is an example schematic view of a wireless local area network (WLAN) split into partitions according to the present disclosure.

FIG. 3 shows a schematic view of a WLAN 300 according to the present disclosure which is similar to FIG. 1. The WLAN 300 includes a plurality of APs 301, 302, 303, 304, 305, 306 and 307 each of which has at least one radio. Unlike the WLAN 100 of FIG. 1, the radios of WLAN 300 are split into a plurality of partitions 300A, 300B and 300C. Each partition includes at least one radio. While there are three partitions shown in FIG. 3, this is merely an example and other examples could have more or fewer partitions. Partitions 300A-300C are applicable all radios of the APs that operate on the same frequency band (e.g., 5 GHz). For the other radios of the APs that operate on another frequency band (e.g., 2.4 GHz), the WLAN 300 would be partitioned differently into N number of partitions (not shown). Thus, the partitions of a first frequency band and the partitions of a second frequency band may include different radios and may be separate and distinct from each other. In some examples there may be a same number of partitions in respective frequency bands and the partitions in respective frequency bands may overlap, but in other examples the respective frequency bands may have different numbers of partitions and/or differently shaped partitions.

There is a storage 310, which is similar to the non-transitory storage medium 110 of FIG. 1 and stores data 312 collected from the plurality of APs 301-307. There is a channel planner 320, which is similar to the channel planner 120 of FIG. 1 and calculates a new channel plan for the plurality of APs 301-307. The channel planner 320 may include a processor 322 and a non-transitory storage medium 323 storing a plurality of instructions which are executable by the processor 322. The instructions many include instructions 324 to obtain data collected from the plurality of APs, similar to the instructions 124 of FIG. 1. The instructions may include instructions 325 to split the WLAN into a plurality of partitions (e.g. 300A-300C). The instructions may include instructions 326 to calculate a new channel plan for each partition. These instructions 326 are similar to the instructions 124 of FIG. 1, except that a respective new channel plan is calculated for each respective partition. Splitting the WLAN into a plurality of partitions and calculating a channel plan for each partition separately may reduce the complexity and/or speed up the calculation of the channel plan. The channel plan for different partitions may be calculated by different processors 322 in parallel. The instructions may include instructions 328 to determine for each partition whether or not to implement the respective new channel plan. Thus, a new channel plan may be implemented for some partitions and not for other partitions, for all partitions, or for none of the partitions. The criteria for determining whether to implement the respective new channel plan may be the same as described above for FIG. 1 and FIG. 2, but applied to each partition separately.

Figure 4:
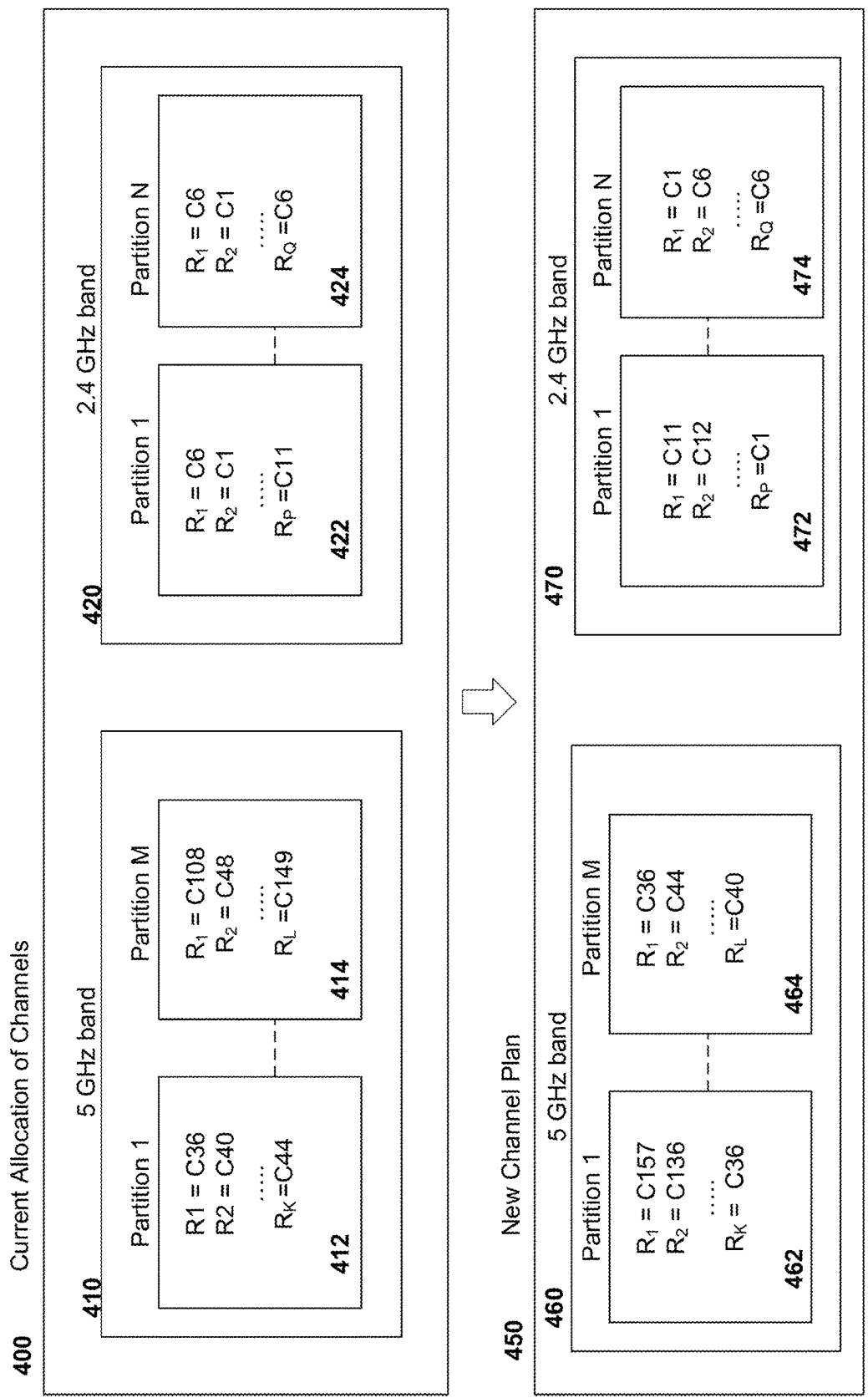
FIG. 4 is an schematic diagram showing an example of a current allocation of channels to radios and an example of a new channel plan according to the present disclosure.

FIG. 4 shows a schematic example of current allocation of channels 400 and a schematic example of a new channel plan 450. The current allocation of channels may include channels in a first frequency band 410 such as 5 GHz and channels in a second frequency band 420 such as 2.4 GHz. Each frequency band may include a respective allocation of channels to radios for each partition. The example of FIG. 4 shows an allocation of channels to radios 412 for the first partition in the first frequency band and an allocation of channels to radios 414 for an Mth partition in the first frequency band. Also shown is an allocation of channels to radios 422 for the first partition in a second frequency band 420 and an allocation of channels to radios 424 for an Nth partition in the second frequency band 420. In this context, M and N are nominal integer numbers indicating the number of partitions in the first and second frequency bands respectively. It is to be understood that the first frequency band and second frequency band may have the same number of partitions, in which case M is equal to N, or a different number of partitions in which case M is not equal to N.

The collected data may uniquely identify the radios by a radio identifier. In one example, the radio identifier may be a combination of an AP identifier of the AP to which the radio belongs and an identifier which distinguishes the radio from other radios in the same AP. In FIG. 4, each radio is denoted by a capital R and a subscript. Thus, the first partition 412 of the first frequency band 410 includes K radios where K is a nominal integer denoting the number of radios, of which a first radio $R_1$, a second radio $R_2$ and a Kth radio $R_K$ are shown in FIG. 4. Meanwhile, the Mth partition includes L radios, where L is a nominal integer denoting the number of radios, of which a first radio $R_1$, a second radio $R_2$ and a Lth radio $R_L$ are shown in FIG. 4. It is to be understood that the radios in each partition are different, so for example the first radio $R_1$ of the first partition is different from the first radio $R_1$ of the Mth partition. In a similar way, the first partition 422 of the second frequency band is depicted as including P radios and the Nth partition 424 of the second frequency band is depicted as including Q radios, where P and Q are nominal integers denoting the number of radios in the respective partitions. Each partition may have the same or a different number of radios to any of the other partitions.

The current allocation of channels 400 indicates a channel number which is allocated to each radio. So, for example, in the first partition 412 of the first frequency band, the first radio $R_1$ is allocated channel C36, the second radio $R_2$ is allocated channel C40 and the Kth radio $R_K$ is allocated channel C44. Radios which are allocated the same channel will operate at the same frequency, so for instance, the first radio $R_1$ in the first partition 422 of the 2.4 GHz frequency band and the first radio $R_1$ in the Nth partition 424 of the 2.4 GHz frequency band are both allocated to C1 and therefore operate at the same frequency. Likewise, in the new channel plan 450, the Kth radio $R_K$ in the first partition 462 of the 5 GHz frequency band is allocated the same channel C36 as the first radio $R_1$ in the Mth partition 464 of the 5 GHz frequency band and therefore both radios operate on the same frequency.

It can be seen in the example of FIG. 4 that the new channel plan 450, which may be calculated by a channel planner to obtain better network performance, allocates a different channel to at least some of the radios compared to the current allocation of channels 400. Thus, for example, the new channel plan for the first partition 462 of the first frequency band 460 shows a different channel allocated to each radio compared to the current allocation of channels 400 to the radios in the first partition 412 of the first frequency band 410. Meanwhile, the new channel plan 450 for the Nth partition 474 of the second frequency band 470 shows different channels allocated to the first and second radios $R_1$ and $R_2$, but a same channel plan allocated the Qth radio $R_Q$. While two frequency bands have been shown in FIG. 4, it is to be understood that other examples may include just one frequency band, or more than two frequency bands.

As discussed above, a first metric may be used to compare the performance of the network with the current allocation of channels to a predicted performance of the network with the new channel plan, in order to determine if the new channel plan should be implemented. Also, as discussed above, if the first metric exceeds a predetermined threshold, indicating that the network performance may be better by at least a certain predetermined threshold, then the new channel plan may be implemented.

However, predicting the network performance with the new channel plan may consume a non-trivial amount of time and/or processing power. Furthermore, there may be some circumstances in which it is better to implement the new channel plan even if the first metric is not exceeded. For instance, if a new AP is added, the current allocation of channels is suffering from interference, or there has been a change in network usage or a change in the radio frequency environment.

Figure 5:
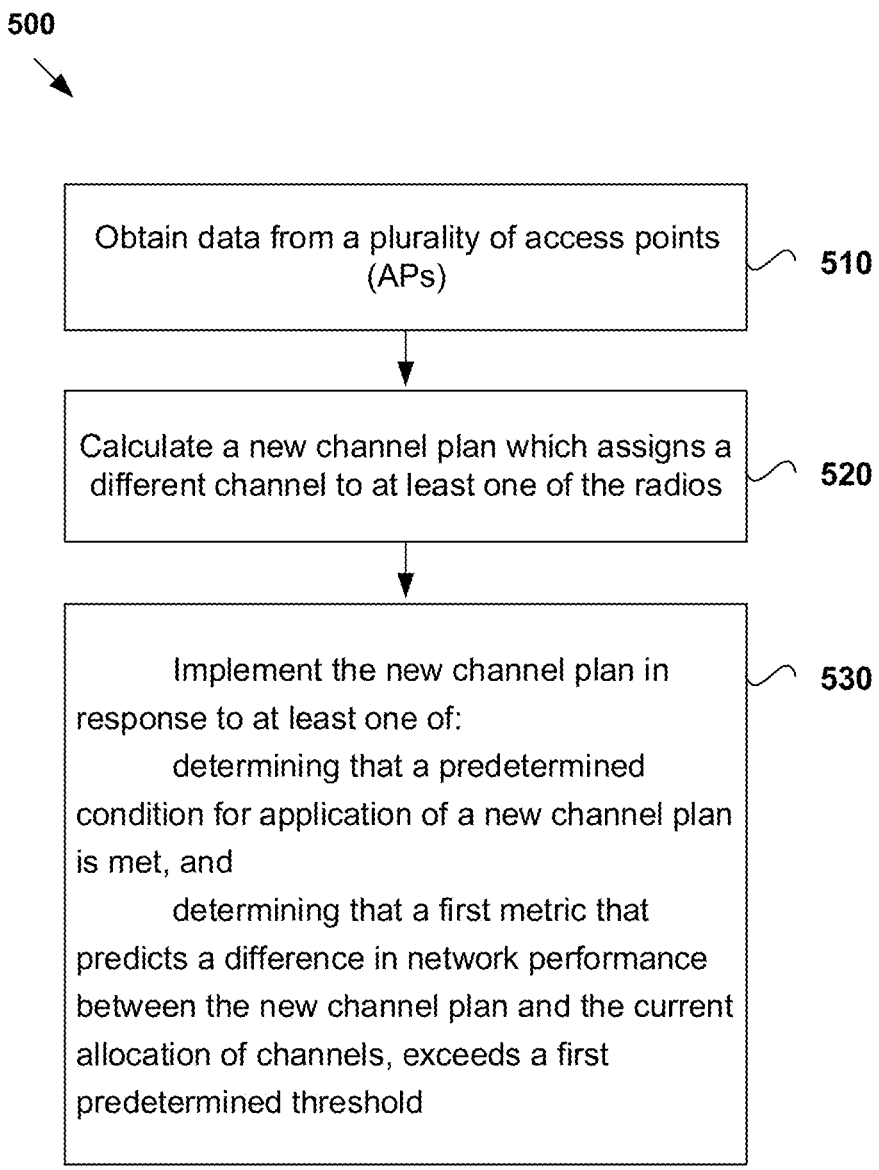
FIG. 5 is a flow diagram of an example method according to the present disclosure.

FIG. 5 shows a method which may be implemented by a system according to the present disclosure. For example, the method may be implemented by the channel planner shown in FIG. 1 or FIG. 3. The method is similar to the method of FIG. 2, but includes additional criteria under which the new channel plan may be implemented.

At block 510, data is obtained from the plurality of access points is obtained. This may be similar to block 210 of FIG. 2 described above.

At block 520, a new channel plan which assigns a different channel to at least one of the radios is calculated. This may be similar to block 210 of FIG. 2 described above.

Blocks 510 and 520 may be carried out for the entire WLAN or for individual partitions of the WLAN.

At block 530, the new channel plan is implemented in response to at least one of: determining that a predetermined condition for application of a new channel plan is met, or determining that a first metric that predicts a difference in network performance between the new channel plan and the current channel allocation, exceeds a first predetermined threshold. The first metric may be the same as the first metric described above with reference to block 230 of FIG. 2.

If neither the predetermined condition is met, nor the first predetermined threshold exceeded, then a determination may be made not to implement the new channel plan and instead to maintain the current allocation of channels to radios. Thus, the method may include maintaining the current allocation of channels in response to determining that the first metric does not exceed the first predetermined threshold and the predetermined condition for application of the new channel plan is not met.

As can be seen from the above, the method of FIG. 5 implements the new channel plan if either the first metric is exceeded, or the predetermined condition is met, or if both the first metric is exceeded and the predetermined condition are met. By use of the predetermined condition, the new channel plan can be implemented even in cases where the first metric is not exceeded.

In one example, the predetermined condition for application of a new channel plan is met in response to determining that a second metric relating to radio interference in the current allocation of channels exceeds a second predetermined threshold. In this way, if a radio is suffering from interference above a threshold amount, then a new channel plan may be implemented for the WLAN, or for the partition containing the radio if the WLAN is split into partitions with respect to the particular frequency band. The new channel plan may allocate a different channel to the particular radio thereby alleviating the interference.

In one example, the predetermined condition for application of a new channel plan is met in response to determining that a third metric relating to a characteristic of channels in the new channel plan exceeds a third predetermined threshold. In this context, the characteristic of a channel may include a property of the channel other than the channel number or channel frequency. For example, the characteristic may be a channel width. If more than a threshold number or proportion of the radios have modified channel characteristics, aside from channel frequency, in the new channel plan, then the channel planner may implement the new channel plan.

In one example, the predetermined condition for application of a new channel plan is met in response to determining that a fourth metric relating to network usage has changed by more than a fourth predetermined threshold. For example, if network usage has changed by more than fourth predetermined amount compared to a previous period in time when the current allocation of channels was determined, then the channel planner may implement the new channel plan.

In one example, the predetermined condition for application of a new channel plan is met in response to determining that a fifth metric relating to a radio frequency environment as measured by the plurality of APs has changed by more than a fifth predetermined threshold. For example, if a radio environment as sensed by the plurality of APs has changed by more than a fifth predetermined amount compared to a previous period in time when the current allocation of channels was determined, then the channel planner may implement the new channel plan.

In another example, the predetermined condition for application of a new channel plan may be met in response to the channel planner detecting a change in BSS color of the APs of the WLAN or the partition, which change exceeds a predetermined threshold.

Any single one of, combination of, or all of the above mentioned criteria may form part of the predetermined condition for application of a new channel plan. In one example, these may be considered to be mandatory conditions for application of a new channel plan; that is in one example, if any one of a number of predetermined conditions is met, then new channel plan is implemented even if the first metric does not exceed the first predetermined threshold. In one example, it is first determined whether a predetermined condition is met before calculating the first metric. If the predetermined condition is met, then the new channel plan may be implemented without calculating the first metric. In this way, computing time and processing resources may be saved.

Any one, several, or all of the first to fifth thresholds discussed above may be configurable by a user. In this way, the system may enable users to choose how to balance network performance with network stability. If the user prioritizes network performance, then thresholds which are easy to exceed may be chosen, whereas if the user prioritizes network stability, then thresholds which are difficult to exceed may be chosen. By easy to exceed, it is meant that a relatively small change in network performance or conditions may exceed the threshold. By difficult to exceed, it is meant that a relatively large change in network performance or conditions may be needed to exceed the threshold.

Figure 6:
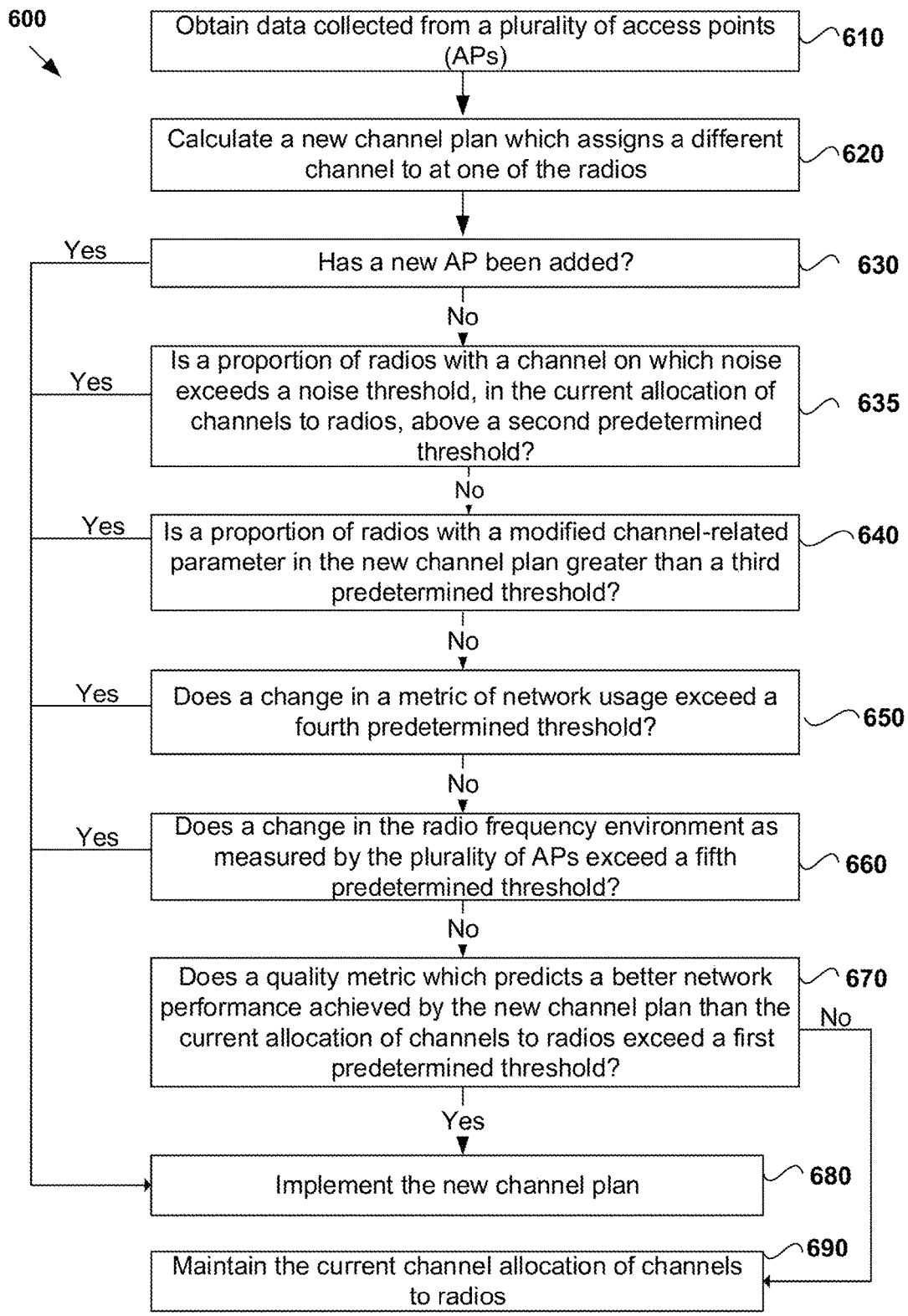
FIG. 6 is a flow diagram of an example method according to the present disclosure.

FIG. 6 shows a further method which may be implemented by a system according to the present disclosure. For example, the method may be implemented by a channel planner as shown in FIG. 1 or FIG. 3.

At block 610, data collected from a plurality of APs is obtained. This may be similar to block 210 of FIG. 2 or block 510 of FIG. 5 discussed above.

At block 620, a new channel plan, which allocates a different channel to at least one radio is calculated. This may be similar to block 220 of FIG. 2 or block 520 of FIG. 5 discussed above.

Blocks 610 and 620 may be performed for the WLAN as a whole or for a partition within the WLAN. FIG. 4 shows an example of allocation of channels to radios according to the collected data and an example of a new channel plan for each of a plurality of partitions of a WLAN.

At block 630, it is determined if a new AP has been added, since the last time a channel plan was implemented. If it is determined that a new AP has been added, then the method proceeds to block 680. Otherwise the method proceeds to block 640.

At block 635, it is determined if a proportion of radios which have a channel on which noise exceeds a noise threshold, in the current allocation of channels to radios, is above a second predetermined threshold. If so, then the method proceeds to block 680, otherwise the method proceeds to block 640. In order to determine if a radio has a channel on which noise exceeds a noise threshold, the AP or the channel planner may determine a noise metric which is based on a number of noise events or radar events measured by the radio on the channel and may compare the noise metric to the noise threshold. For example the noise metric may be based on a number of noise events or radar events measured within a period of time.

At block 640, it is determined if a proportion of radios with a modified channel-related parameter in the new channel plan is above a third predetermined threshold. If so, then the method proceeds to block 680, otherwise the method proceeds to block 650. A modified channel-related parameter may be an intrinsic property of the channel other than the channel number of frequency. For example, the channel-related parameter may be a channel width.

At block 650, it is determined if a change in a metric of network usage exceeds a fourth predetermined threshold. If so, then the method proceeds to block 680, otherwise the method proceeds to block 660.

To determine the change in a metric of network usage, a metric for a current network usage may be compared with the same metric in a previous time period, such as a network usage at the time when the current allocation of channels was determined. The metric of network usage may based on at least one of: a number of wireless client devices serviced per radio, a quantity an amount of wireless traffic transmitted, and a type of wireless client devices using the network. In this way, a new channel plan may be implemented if a change in an amount of network traffic is exceeds a threshold amount, or if a number of wireless clients serviced by the WLAN changes by more than a threshold amount. Further a new channel plan may be implemented if the type of wireless client devices (e.g. 5 GHz wireless client devices or 2.4 GHz wireless client devices) served by the WLAN or by a partition of the WLAN changes such that a number of one type of client device exceeds a threshold or the proportion of client devices of one type exceeds a threshold.

At block 660, it is determined if a change in the radio frequency environment as measured by the plurality of APs exceeds a fifth predetermined threshold. If so, then the method proceeds to block 680, otherwise the method proceeds to block 670.

The radio frequency (RF) environment measured by the radios of the plurality of APs may be determined from the collected data. For example, the radio frequency environment may include at least one of: a number of external radio signals sensed received by radios of the APs, a received signal strength of each external radio signal as measured by the radios of the APs, noise on the channels as measured by the radios on the APs and path loss on the channels as measured by the radios of the APs. The external radio signals may be from radios, that belong to the same WLAN, radios belonging to another WLAN (e.g. in a neighboring company or building) or other sources of radio signals external to the WLAN. The radio frequency environment may change due to a new radio on another WLAN, due to existing APs in the WLAN being moved, due to new physical barriers, e.g., furniture or office walls, being put in place, or other reasons that affect wireless radio signal transmission within the WLAN coverage area.

At block 670, it is determined whether a difference between a predicted quality metric for the new channel plan and a quality metric for the current allocation exceeds a first predetermined threshold. If so, then the method proceeds to block 680, otherwise the method proceeds to block 690.

At block 680, the new channel plan is implemented. For example, the new channel plan may be implemented by the channel planner controlling each of the APs to allocate channels to their radios in accordance with the new channel plan.

At block 690, the new channel plan is not implemented and the current allocation of channels to radios is maintained.

The method of FIG. 6 and the various blocks therein may be applied to the WLAN as a whole, or to individual partitions within the WLAN.

The method of FIG. 6 may be varied by changing the order of the blocks to any order and/or by leaving out one more of the blocks. However, any such variation of the method includes at least blocks 610, 620, 680, 690 and at least one of blocks 635, 640, 650, 660, and 670. The above described method thus provides a way of balancing network stability with network performance. According to the above method, a new network plan may be implemented if the new channel plan is predicted to provide a better network performance by an amount exceeding a predetermined threshold or if another predetermined condition is met. Otherwise, the current allocation of channels to radios may be maintained to keep the network stable.

Data may be collected from the APs periodically, continuously and/or received in response to predetermined events occurring at the APs or measured by a radio of an AP. A new channel plan may be calculated periodically, in response to a request from a network manager or in response to a predetermined event. When a new channel plan is calculated, the channel planner may determine whether to implement the new network plan in accordance with the method of FIG. 2, FIG. 5 or FIG. 6 described above.

Figure 7:
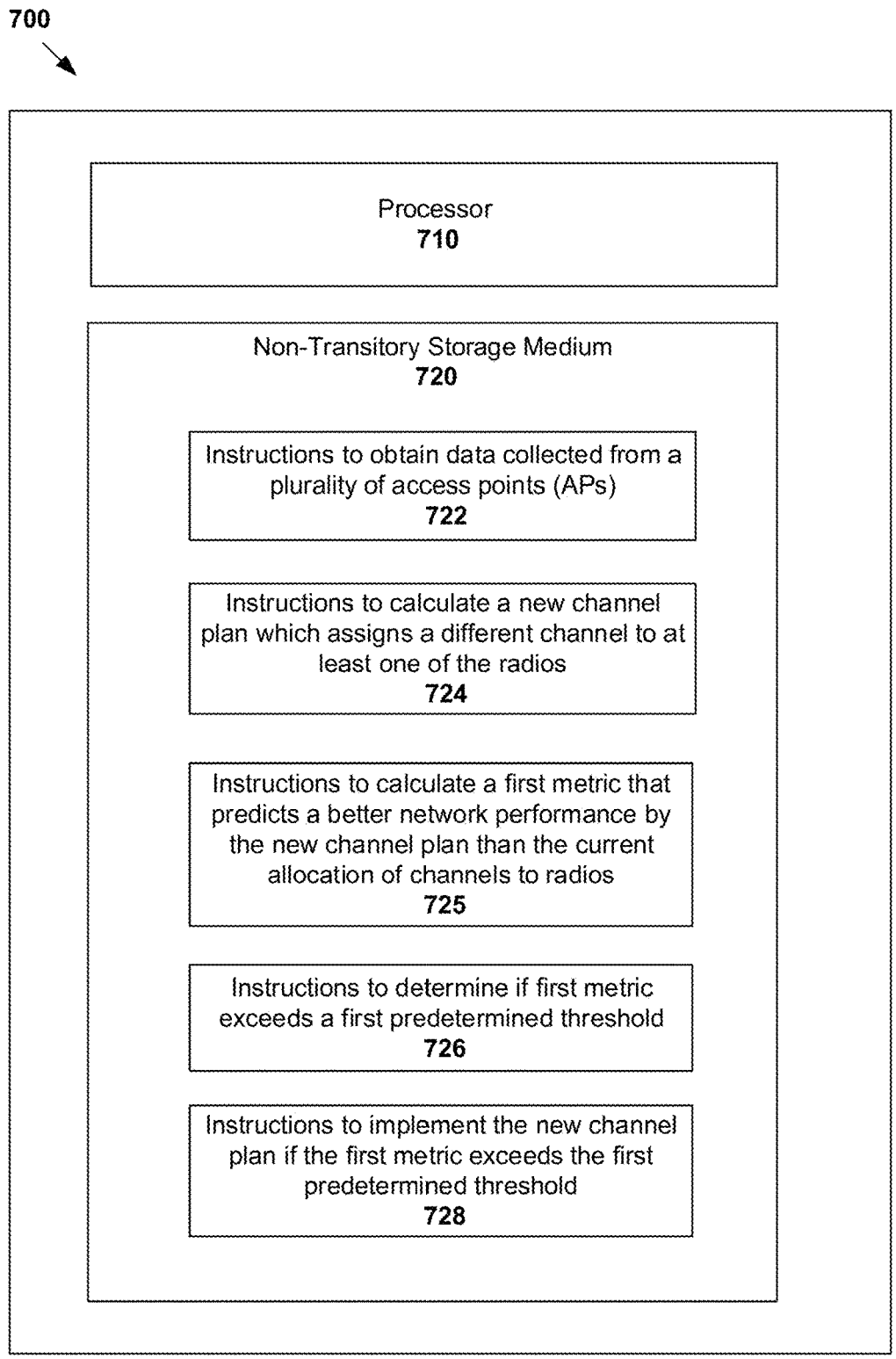
FIG. 7 is an example schematic diagram of an apparatus according to the present disclosure.

FIG. 7 is a schematic diagram showing an example of a channel planner apparatus 700 according to the present disclosure. The channel planner apparatus may for example be a wireless controller or other network device, a server, a computing apparatus in data center or a computing apparatus in the cloud. The apparatus 700 includes a processor 710 and a non-transitory storage medium 720. The processor 710 may for example be a central processing unit (CPU), processing unit, application specific integrated circuit (ASIC), logic unit, or programmable gate array etc. The non-transitory storage medium 720 may be a non-transitory machine readable storage medium, for example be a random access memory, a read only memory, a flash memory, etc. The non-transitory storage medium 720 stores a plurality of machine readable instructions which are executable by the processor. The instructions may include instructions 722 to obtain data collected from a plurality of APs, instructions 724 to calculate a new channel plan which allocates a different channel to at least one radio, instructions 725 to calculate a first metric that predicts a better network performance by the new channel plan than the current allocation of channels to radios, instructions 726 to determine if first metric exceeds a first predetermined threshold, and instructions 728 to implement the new channel plan if the first metric exceeds the first predetermined threshold. These instructions may cause the processor 710 to carry out actions corresponding to the method blocks of FIG. 2. The non-transitory storage medium may include further instructions which, when executed by the processor, cause the channel planner apparatus 700 to carry out any of the methods described herein with reference to FIGS. 1-6.

Figure 8:
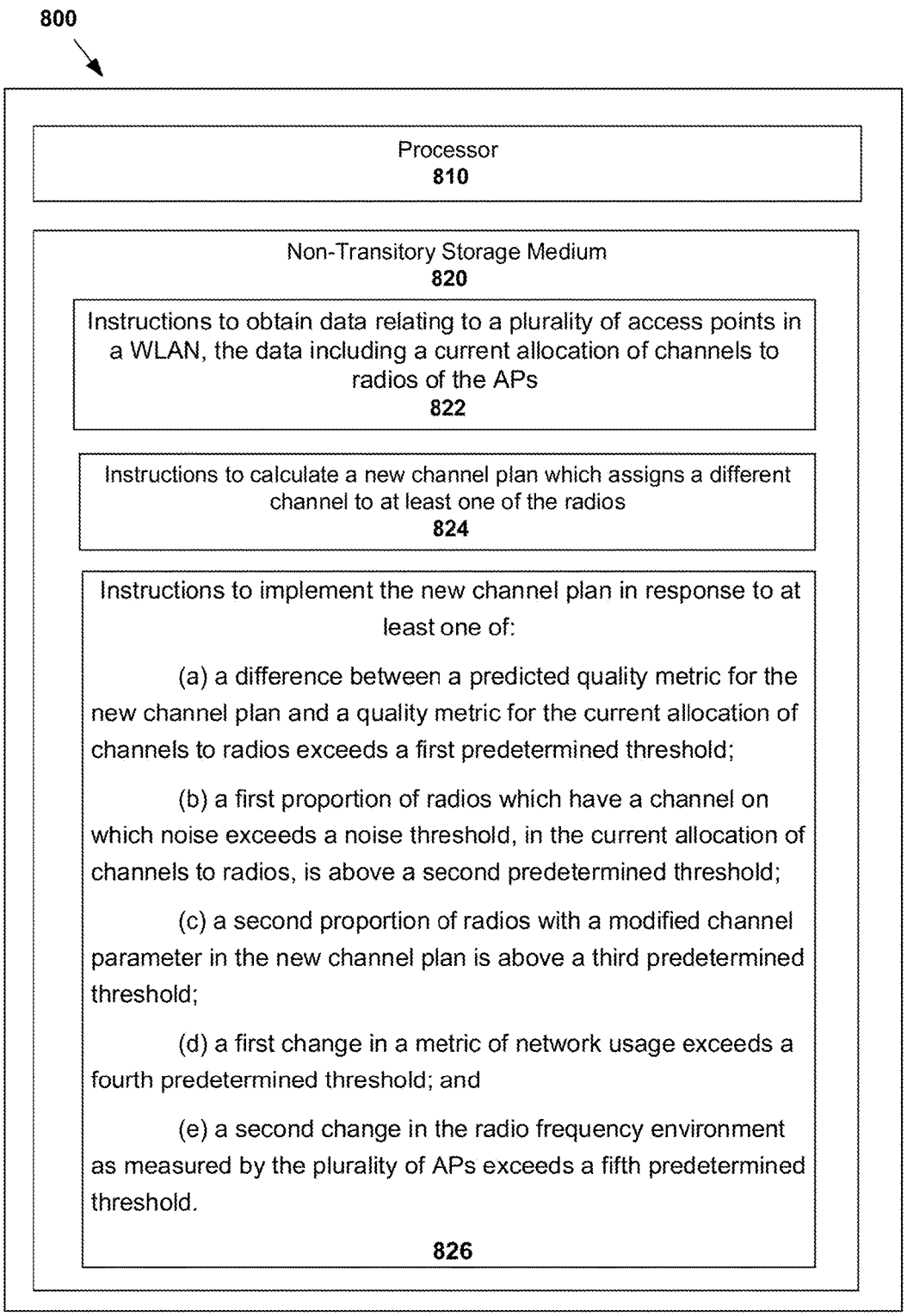
FIG. 8 is an example schematic diagram of an apparatus according to the present disclosure.

FIG. 8 is a schematic diagram showing an example of a channel planner apparatus 800 according to the present disclosure. The channel planner apparatus may for example be a wireless controller or other network device, a server, a computing apparatus in data center or a computing apparatus in the cloud. The apparatus 800 includes a processor 810 and a non-transitory storage medium 820. The processor 810 may for example be a central processing unit (CPU), processing unit, application specific integrated circuit (ASIC), logic unit, or programmable gate array etc. The non-transitory storage medium 820 may be a non-transitory machine readable storage medium, for example be a random access memory, a read only memory, a flash memory, etc. The non-transitory storage medium 820 stores a plurality of machine readable instructions which are executable by the processor. The instructions may include instructions 822 to obtain data relating to a plurality of access points in a WLAN, the data including a current allocation of channels to radios of the APs, instructions 824 to calculate a new channel plan which assigns a different channel to at least one of the radios, and instructions to implement the new channel plan in response to at least one of:

(a) a difference between a predicted quality metric for the new channel plan and a quality metric for the current allocation of channels to radios exceeds a first predetermined threshold, (b) a first proportion of radios which have a channel on which noise exceeds a noise threshold, in the current allocation of channels to radios, is above a second predetermined threshold;

(c) a second proportion of radios with a modified channel-related parameter in the new channel plan is above a third predetermined threshold;

(d) a first change in a metric of network usage exceeds a fourth predetermined threshold; and (e) a second change in the radio frequency environment as measured by the plurality of APs exceeds a fifth predetermined threshold.

The predetermined thresholds may be user configurable to enable a user, such as a network manager, to determine the desired balance of network performance to network stability. The predetermined thresholds may be stored in the non-transitory storage medium 820. The instructions stored on the non-transitory storage medium 820 may be executed by the processor 810 to carry out any of the methods described herein with reference to FIGS. 1-6.

All of the features disclosed in this specification (including any accompanying claims, abstract and drawings), and/or all of the blocks of any method or process so disclosed, may be combined in any combination, except combinations where at least some of such features and/or blocks are mutually exclusive. Furthermore, except where explicitly stated otherwise or where the context or logic demands otherwise, the processes described herein may be carried out in any order and are not limited to the specific order shown in the particular examples. Some the processes or method blocks described herein may be carried contemporaneously with each other.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A non-transitory machine readable medium comprising instructions which are executable by a processor to:
   obtain data collected from a plurality of access points (APs) in a wireless local area network (WLAN), the data including a current allocation of channels to radios of the APs according to a current channel plan;
   calculate a new channel plan which assigns a different channel to at least one of the radios;
   calculate a first metric that predicts better network performance achieved by the new channel plan than the current allocation of channels to the radios;
   determine whether the first metric exceeds a first predetermined threshold; and
   implement the new channel plan in response to determining that the first metric exceeds the first predetermined threshold and in response to determining at least one of:
      that a proportion of the radios which have a channel on which noise exceeds a noise threshold, in the current allocation of channels to radios, is above a second predetermined threshold;
      that a proportion of the plurality of radios in the new channel plan which have a modified channel-related parameter is above a third predetermined threshold;
      that a change in a metric of network usage compared to the metric of network usage at a previous time exceeds a fourth predetermined threshold; and
      that a change in a radio frequency environment as measured by the plurality of APs exceeds a fifth predetermined threshold.

2. The non-transitory machine readable medium of claim 1 including instructions to compare the second predetermined threshold to a noise metric which is based on a number of noise events or a number of radar events measured by a radio on the channel.

3. The non-transitory machine readable medium of claim 1, wherein the modified channel-related parameter is a channel width.

4. A non-transitory machine readable medium comprising instructions which are executable by a processor to:
   obtain data relating to a plurality of access points (APs) in a wireless local area network (WLAN), the data including a current allocation of channels to radios of the APs;
   calculate a new channel plan which assigns a different channel to at least one of the radios;
   apply the new channel plan to the radios of the plurality of APs in response to determining:
      (a) a difference between a predicted quality metric for the new channel plan and a quality metric for the current allocation of channels to radios exceeds a first predetermined threshold; and at least one of:
(b) a first proportion of radios which have a channel on which noise exceeds a noise threshold in the current allocation of channels to radios is above a second predetermined threshold;
(c) a second proportion of radios with a modified channel-related parameter in the new channel plan is above a third predetermined threshold;
(d) a first change in a metric of network usage exceeds a fourth predetermined threshold; and
(e) a second change in the radio frequency environment as measured by the plurality of APs exceeds a fifth predetermined threshold.

5. The non-transitory machine readable medium of claim 4 comprising instructions which are executable by a processor to determine a noise metric for a channel of a radio, based on a number of interference events experienced by the radio on the channel or based on a number of radar events experienced by the radio on the channel.

6. The non-transitory machine readable medium of claim 4, wherein the metric of network usage is based on at least one of a number of wireless client devices served by each radio, an amount of wireless traffic transmitted, and a type of wireless client devices using the WLAN.

7. A method of allocating channels to radios in a wireless local area network (WLAN), the method comprising:
obtaining, by a processor, data from a plurality of access points (APs) in the WLAN, the data including a current allocation of channels to radios of the APs and data relating to a radio frequency environment of the plurality of APs;
calculating, by the processor, a new channel plan which assigns a different channel to at least one of the radios; and
implementing, by the processor, the new channel plan in response to determining, by the processor, that a first metric, which predicts a difference in network performance between the new channel plan and the current allocation of channels, exceeds a first predetermined threshold and in response to:
determining, by the processor, that a predetermined condition for application of the new channel plan is met in response to determining at least one of:
that a second metric relating to radio interference in the current allocation of channels exceeds a second predetermined threshold;
that a third metric relating to a characteristic of channels in the new channel plan exceeds a third predetermined threshold;
that a fourth metric relating to network usage changes by more than a fourth predetermined threshold; and
that a fifth metric relating to a radio frequency environment measured by the plurality of APs changes by more than a fifth predetermined threshold.

8. The method of claim 7 further comprising: maintaining, by the processor, the current allocation of channels in response to determining that the first metric does not exceed the first predetermined threshold and the predetermined condition for application of the new channel plan is not met.

9. The method of claim 7, wherein collecting data from the plurality of access points includes collecting channel width, path loss or other data relating to the radio frequency environment.

10. The method of claim 7 further comprising: implementing, by the processor, the new channel plan in response to determining that the plurality of radios includes a radio which is not included in a channel plan on which the current allocation of channels is based.

11. The method of claim 7 further comprising:
splitting the WLAN into a plurality of partitions;
calculating a respective new channel plan separately for each partition; and
determining for each partition whether to implement the respective new channel plan.

12. The method of claim 7 wherein the predetermined condition and at least the first predetermined threshold are configurable by a user.

* * * * *